Sept. 29, 1931. M. J. ANDERSON 1,825,037
CONVEYING APPARATUS
Filed Feb. 18, 1927 7 Sheets-Sheet 2
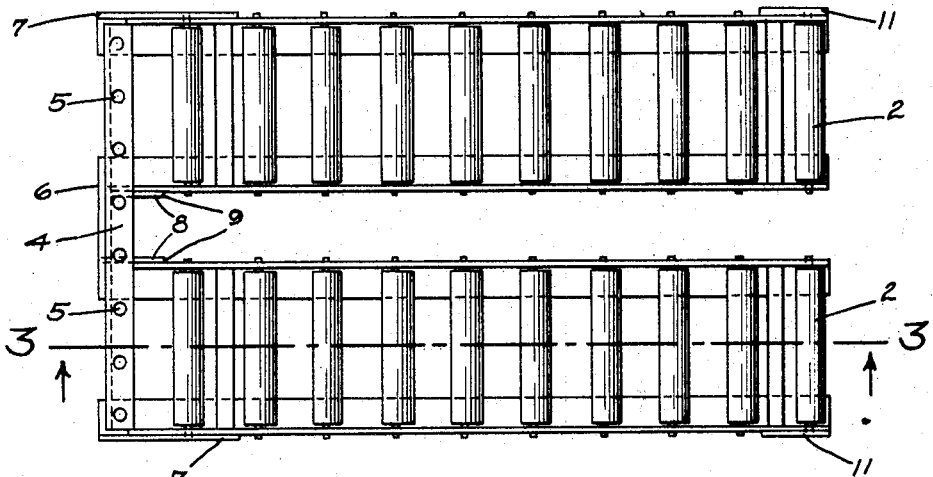
FIG. 2
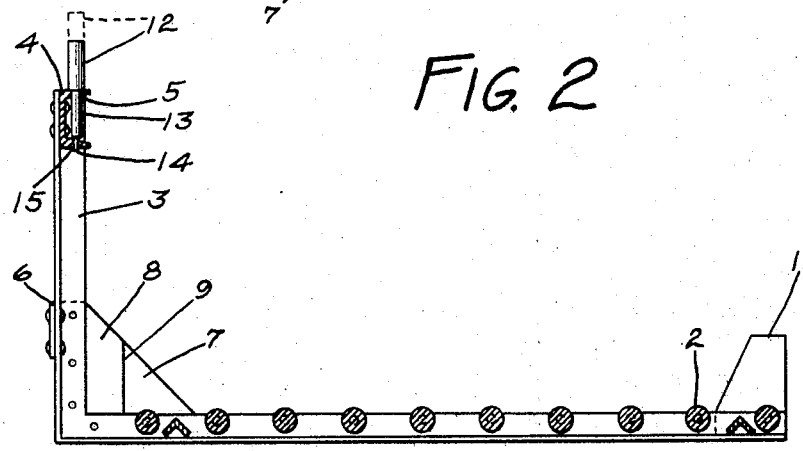
FIG. 3
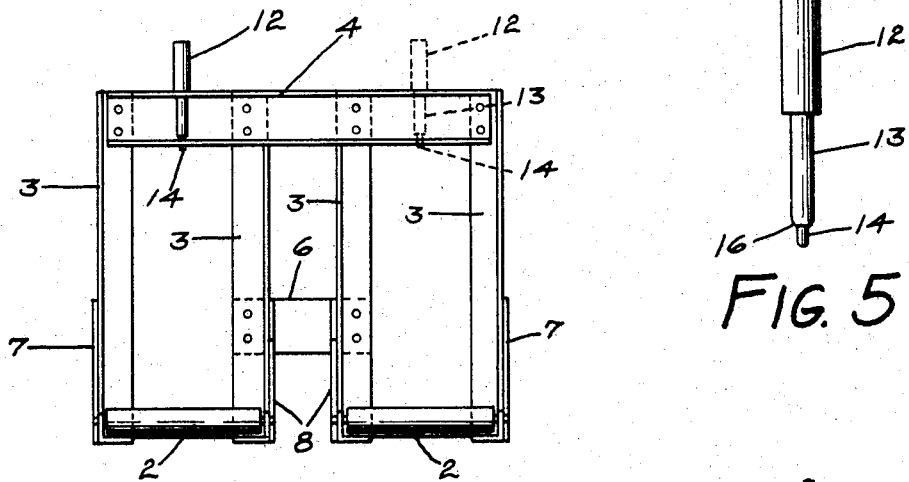
FIG. 4
FIG. 5
INVENTOR
MARTIN J. ANDERSON
BY Paul, Paul Moore
ATTORNEYS Sept. 29, 1931.　　M. J. ANDERSON　　1,825,037
CONVEYING APPARATUS
Filed Feb. 18, 1927　　7 Sheets-Sheet 3

INVENTOR
MARTIN J. ANDERSON
By Paul, Paul & Moore
ATTORNEYS

Sept. 29, 1931.     M. J. ANDERSON     1,825,037
CONVEYING APPARATUS
Filed Feb. 18, 1927     7 Sheets-Sheet 4

INVENTOR
MARTIN J. ANDERSON
By Paul, Paul & Moore
ATTORNEYS

Sept. 29, 1931.  M. J. ANDERSON  1,825,037
CONVEYING APPARATUS
Filed Feb. 18, 1927   7 Sheets-Sheet 6

INVENTOR
MARTIN J. ANDERSON
BY
ATTORNEYS

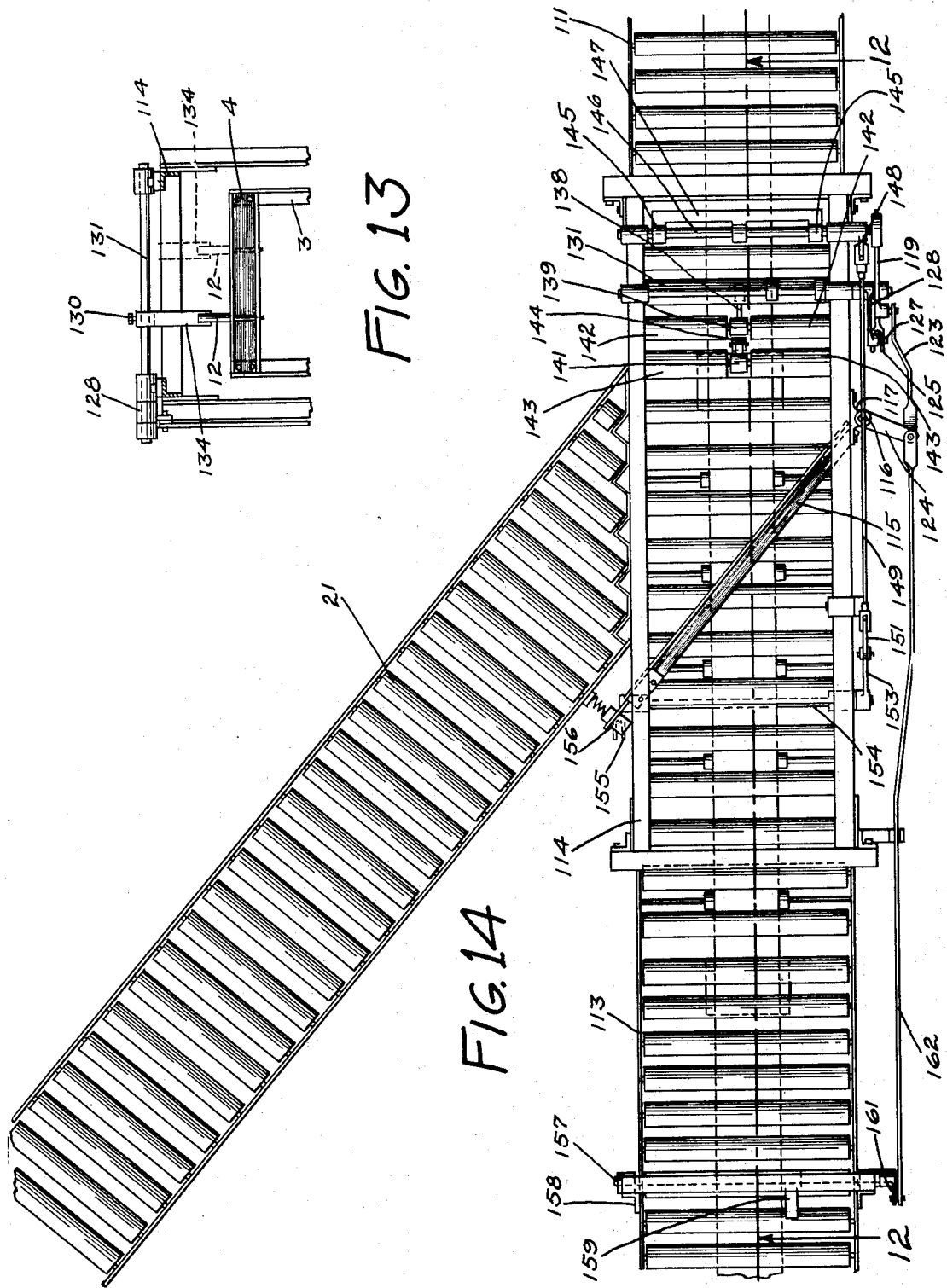

Patented Sept. 29, 1931

1,825,037

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS

Application filed February 18, 1927. Serial No. 169,281.

This invention relates generally to improvements in conveying apparatus, and more particularly relates to improved mechanisms for automatically selectively controlling the routing packages or articles over a conveyer system, from a central dispatching point or station, to predetermined destinations or stations along the route as, for instance, when used in warehouses and such places, packages delivered thereto for storage may be automatically routed over the conveyer system to their respective storage bins, or destinations, by a dispatcher or operator stationed at the receiving point or a central distributing point.

An object of the invention is to provide a conveying apparatus including a routing tray or carriage adapted to carry a package or article and having means thereon for selectively actuating certain mechanisms along the conveyer line for automatically directing the package or article carried thereby, and others following, to predetermined destinations.

A further object of the invention resides in the provision of a routing tray adapted to have control means adjustably positioned thereon which functions to actuate certain mechanisms along the conveyer, depending upon its position upon the tray, and the actuation of such mechanisms by the control means, controlling the deflecting of the packages from the main conveyer onto selected branch lines.

A further object is to provide means for temporarily interrupting the travel of the empty tray and loading a package or commodity thereon, after the tray has been positioned upon the conveyer by the dispatcher, preparatory to being sent out over the conveyer system to actuate the mechanism functioning to deflect or shunt the package carried thereon, from the main conveyer onto a selected branch line or conveyer, after which all packages or articles following the tray will be directed onto the same branch line until another routing tray is sent over the conveying system to re-actuate certain mechanisms and thereby cause other packages to be shunted onto another branch conveyer, or to be returned to the dispatching station from whence they initially started.

A further object is to provide means operable by the position of the control means upon the tray, to remove or unload the package from the tray and to shunt it onto a branch conveyer, followed by the packages directly following, such mechanism allowing the empty tray to continue onward on the main conveyer to be returned to the dispatching station or central distributing point for use in routing other packages.

A further object is to provide a conveyer system provided with a simple mechanism for automatically and selectively directing packages or commodities over the system to predetermined destinations, from a central dispatching station or point; such mechanism including a routing tray having a series of spaced apertures therein adapted to selectively receive one of a series of control pins, which pins are adapted to cooperate with certain mechanism to direct the tray along its route to the desired destination, the location of the selected pin upon the tray, controlling the operation of the mechanism for diverting the packages from the main conveyer onto a selected branch conveyer.

A further object is to provide such a control system of comparatively simple construction, which will be positive and efficient in performance, and which will require but one operator or dispatcher to selectively direct the packages or articles thereover, from a central dispatching station, to any one of a plurality of branch conveyers or destinations.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming a part of this specification;

Figure 2 is a plan view of one of the routing trays showing the spaced apertures at the forward end thereof adapted to receive the control pin;

Figure 3 is a sectional elevation on the line 3—3 of Figure 2;

Figure 4 is a rear end view of a routing tray;

Figure 5 is an enlarged detail view of a control pin;

Figure 11:
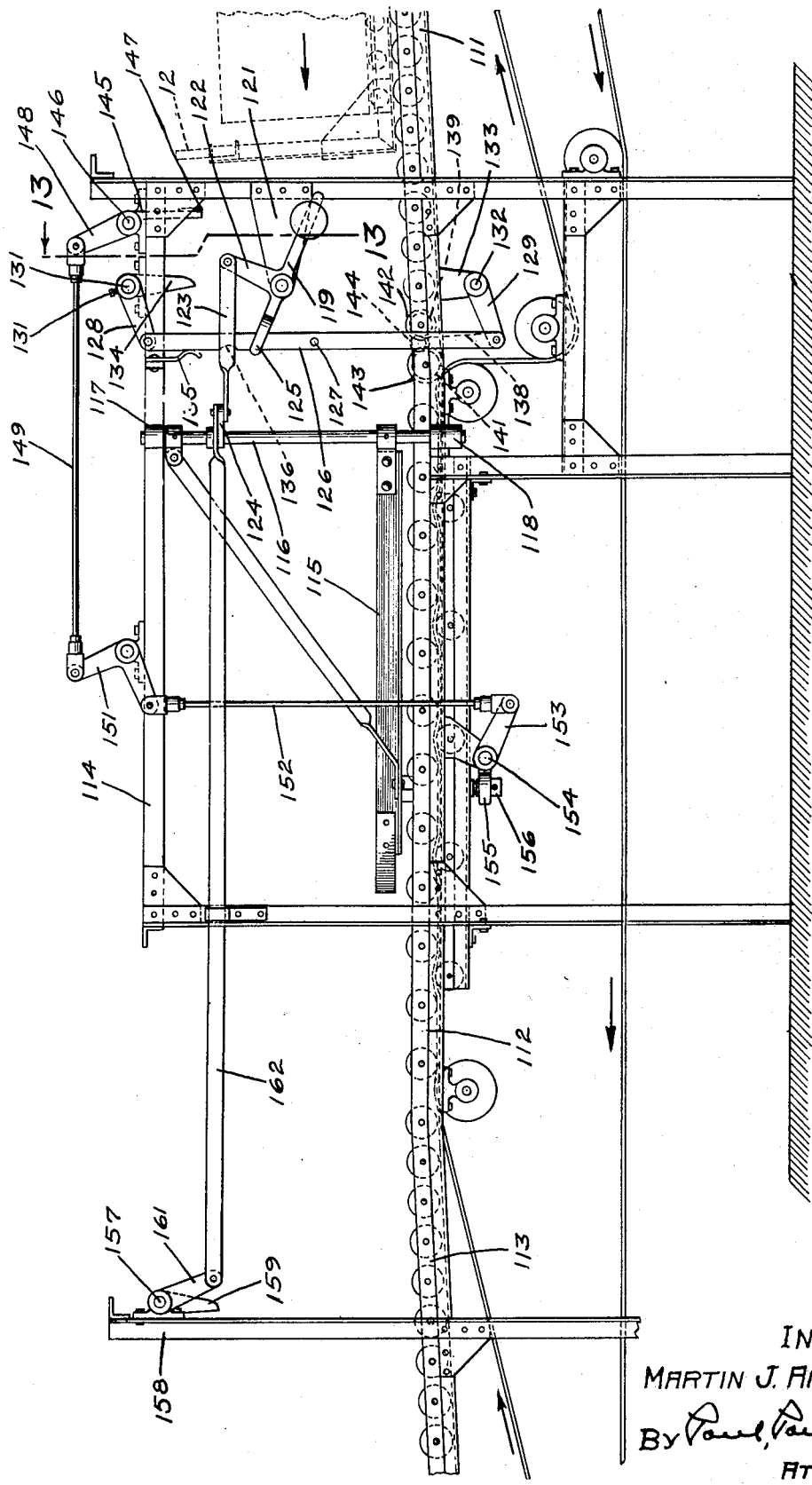
Figure 11 is an elevational view of the mechanism functioning to unload the package from the tray and also showing the deflector for diverting the packages from the main conveyer onto a branch conveyer, the parts being shown in normal inoperative position.
Figure 12:
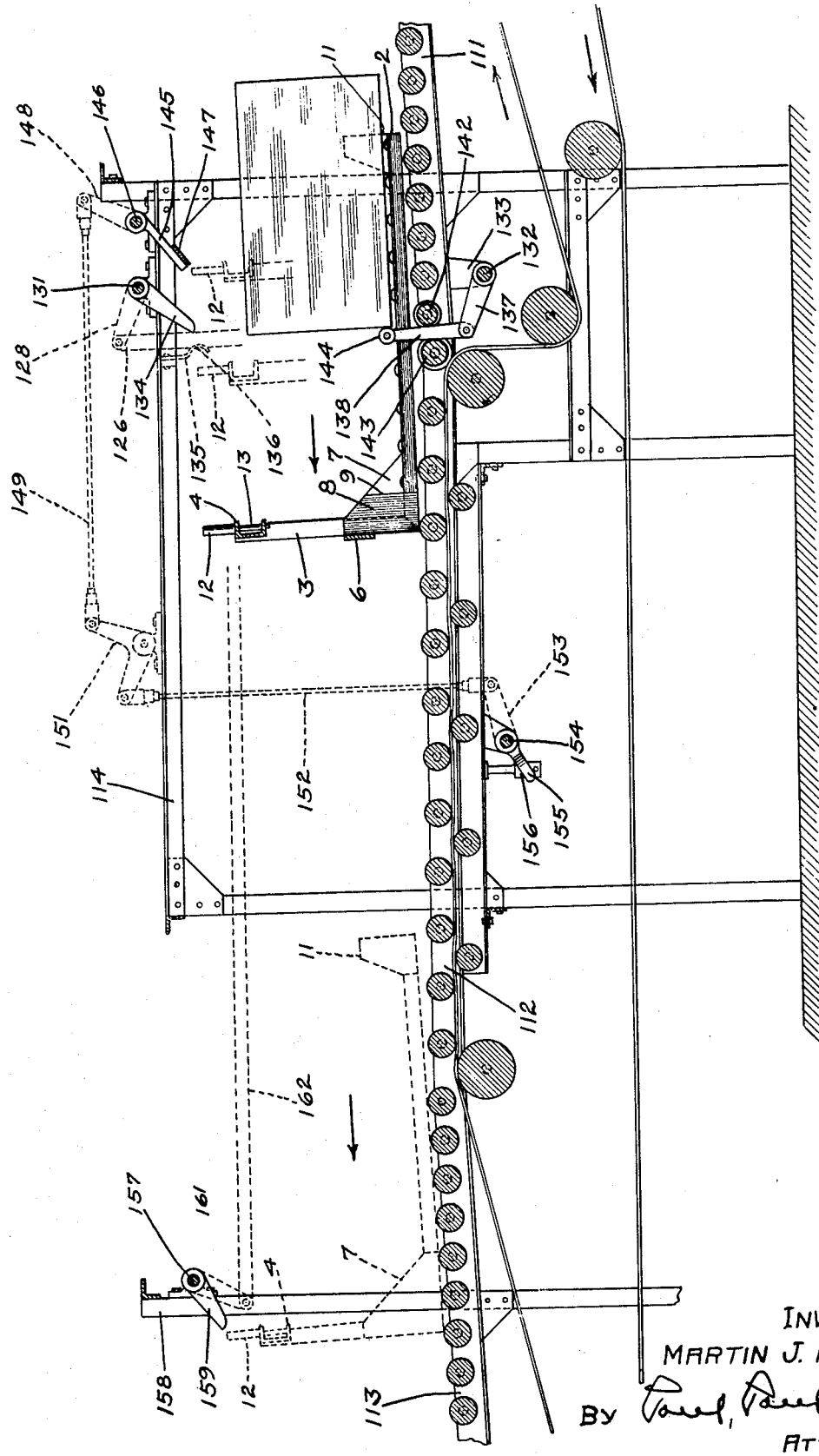

Figure 12 is a longitudinal sectional view on the line 12—12 of Figure 14 showing the means for engaging the package to unload it from the tray and to temporarily interrupt its travel while the tray continues onward to the dotted line position shown at the left hand side of Figure 12, which is the position assumed after having actuated the mechanism to release the package and to move the deflector over the main conveyer to divert the packages onto the branch conveyer;

Figure 13 is a detail sectional view on the line 13—13 of Figure 11 showing different positions of the control pin upon the routing tray as required for the different branch conveyers; and Figure 14 is a plan view of Figure 12.

Routing tray

The routing tray used in connection with this novel conveyer system preferably comprises two parallel rows of roller conveyer sections 2, having uprights 3 secured to the forward end thereof and to the upper ends of which is secured a member 4, preferably of channel iron, having a series of apertures 5 provided in the upper web thereof as shown in Figures 2 and 3. A tie-plate 6 secures together the lower ends of the intermediate uprights 3 as shown in Figure 4. The tie-plate 6 is spaced from the bottoms of the conveyer sections 2 to provide clearance between the intermediate uprights 3 for the stop rollers adapted to engage the packages or articles positioned upon the tray, as will subsequently be described. In the following description and, for the sake of brevity, the term "package" will be used to cover all commodities, articles, or merchandise, transported over the conveyer system, whether such packages be in the form of cartons, bundles, boxes, bags, etc. The outer uprights 3 are suitably secured to the conveyer sections 2 by gusset plates 7 (see Fig. 3). The intermediate uprights 3 are similarly secured to the conveyer sections by gusset plates 8, which are cut away as shown at 9 to provide stops for the package positioned upon the tray. Upright plates 11 are provided at the rear outer corners of the conveyer sections 2 adapted to be engaged by power driven means, not shown, for pushing the tray up an incline as, for instance, when it is desired to elevate it to a higher elevation.

Control pin

The means provided for actuating the mechanism along the main conveyer for shunting or diverting the routing tray and packages from the main conveyer onto a branch conveyer, consist of a control pin 12 having a reduced lower portion 13 adapted to be received in one of the apertures 5, provided in the upper web of the cross channel 4 of the routing tray, (see Fig. 5). The lower end 14 of the pin is terminally reduced as shown, and is adapted to be received in apertures 15 provided in the lower web of the cross channel 4. The shoulder 16 of the control pin is rounded to facilitate inserting the pin through the apertures 5, as shown in Figure 3.

The operation of the mechanism provided in connection with the main conveyer for selectively diverting the packages from the main conveyer onto one of the branch conveyers, is controlled by a single control pin positioned in one of the apertures provided in the cross-channel 4 of the routing tray. The control pins are preferably of the same length for a given floor, and the transverse position of the pins upon the cross member 4 of the routing tray determines the branch conveyer onto which it is desired to divert the packages from the main conveyer.

Figure 1:
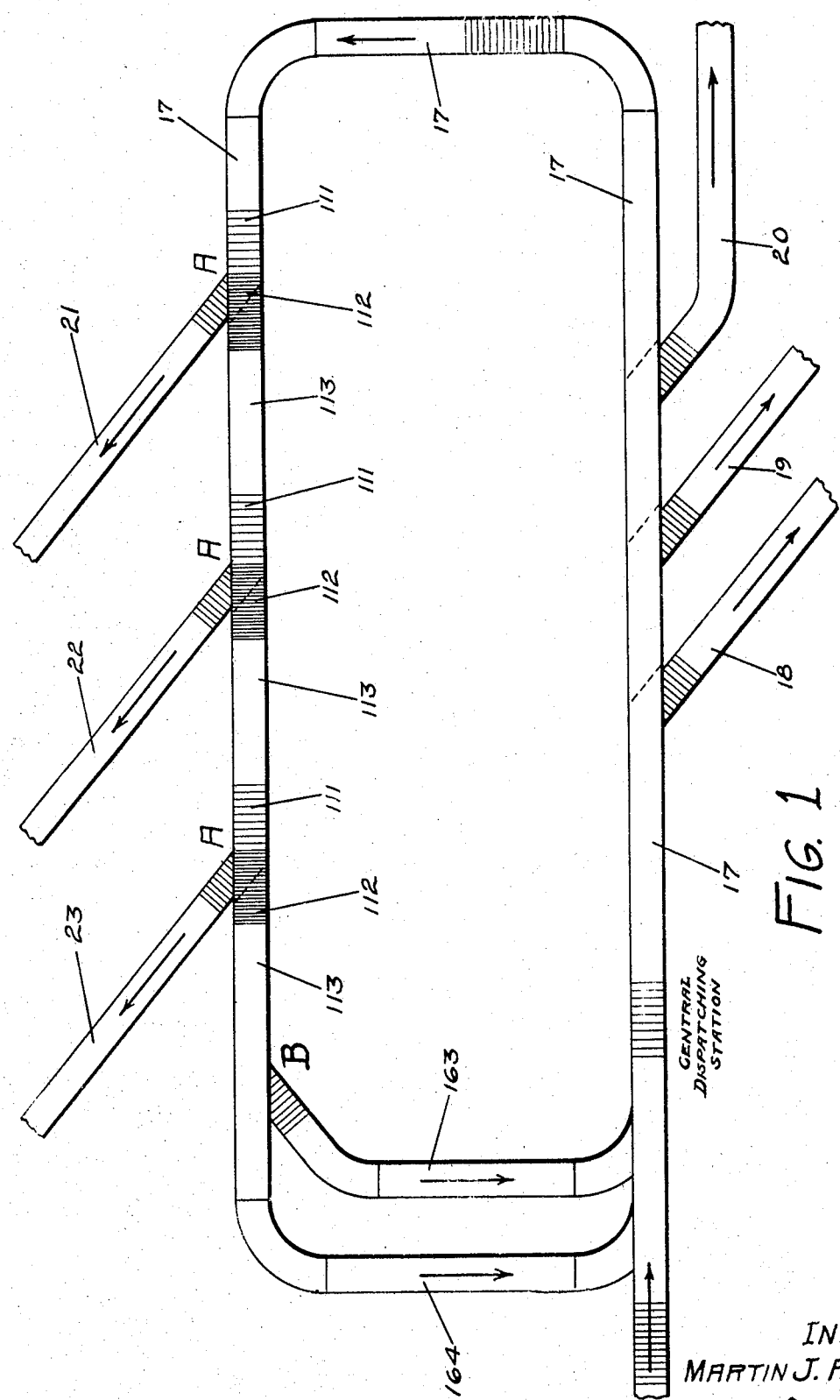
Figure 1 is a diagrammatic plan view of a conveyer system embodying my invention.

In Figure 1 there is shown a diagrammatic representation of a conveyer system in which 17 represents the main conveyer and 18, 19 and 20 representing branch conveyers leading to other floors or locations. 21, 22 and 23 represent branch conveyers connected with the main conveyer 17 and leading therefrom to suitable receiving means or storage bins, not shown. The transverse positions of the control pins upon the routing trays control the diverting of the packages from the main conveyer 17 onto the branch conveyers, shown in Figure 1. Thus, when a control pin is placed in a given aperture on the routing tray, the package carried upon the tray, and those following, will be directed onto a selected branch conveyer as, for instance, if the control pin is placed in the aperture at the left hand side of the routing tray, the commodity may be diverted onto branch conveyer 23 and, if placed in the aperture at the right hand side of the tray, the package may be diverted onto branch conveyer 21, and so on. Thus, it will readily be seen that to selectively divert the packages from the main conveyer onto a given branch conveyer upon a given floor or elevation, the control pin is positioned upon the routing tray in such a manner as to actuate the operating mechanism over the branch conveyer onto which it is desired to divert the packages.

*Tray-loading and starting mechanism*

Figure 6:
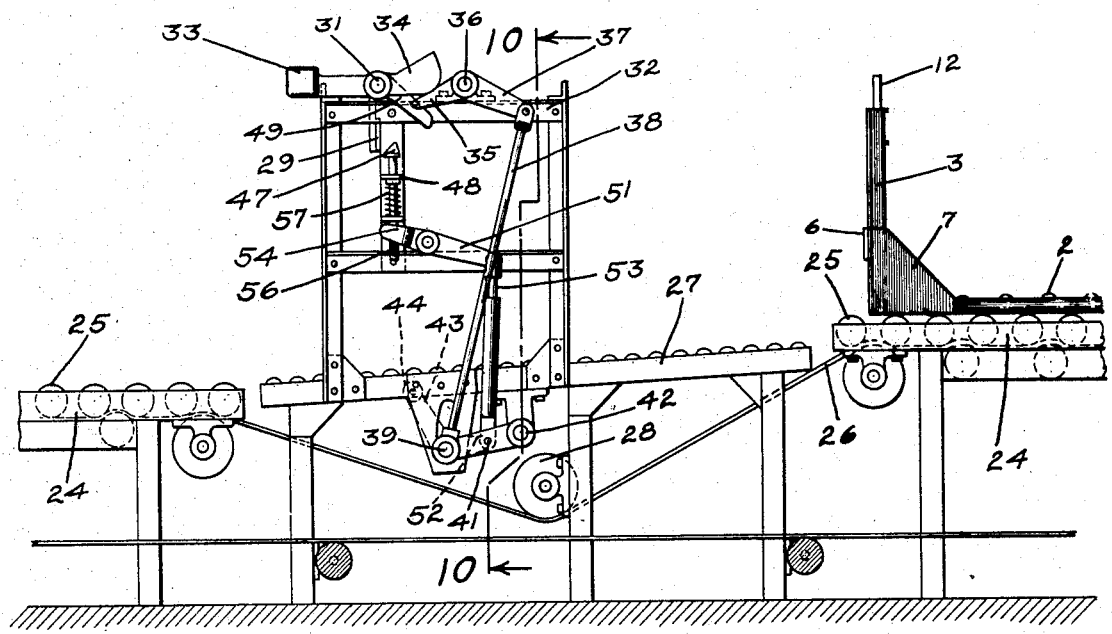
Figure 6 is a side elevation of the tray-loading and starting mechanism, shown in normal inoperative position.

The tray-loading and starting mechanism functions to automatically stop the travel of the empty routing tray, after having been placed upon the conveyer, at a point adjacent the dispatcher and, to temporarily hold it until a package has been loaded thereon, the loading of the package onto the tray actuating the tray-stop mechanism to release the tray together with the package for continuance of travel over the system. (See Figures 6 to 10, inclusive). The dispatching conveyer 24 (see Fig. 1) is power driven and may be either a belt conveyer or of the live roll type, such as shown in the drawings. This conveyer consists of a series of rollers 25 driven from a belt 26 peripherally engaging the rollers, as shown in Figure 6. At the loading point, a section of gravity conveyer 27 is interposed in the dispatching conveyer 24 and the drive belt 26 passes downwardly beneath this section under a roller 28 as shown, in order to keep the belt out of contact with the gravity conveyer section 27.

Figure 9:
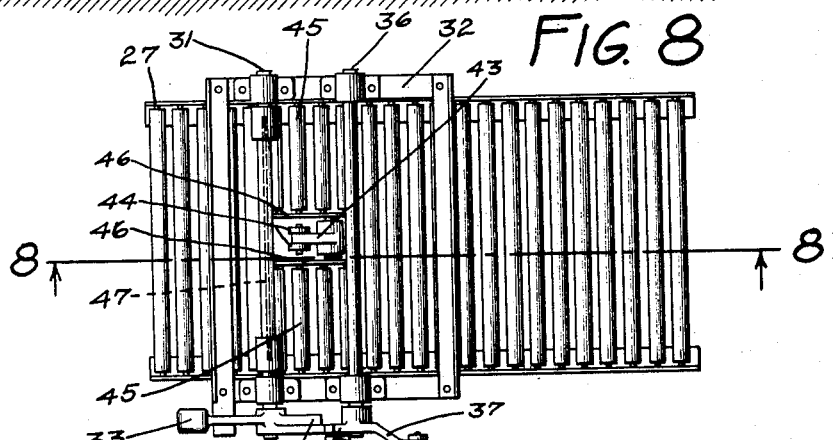
Figure 9 is a plan view of Figure 6.
Figure 10:
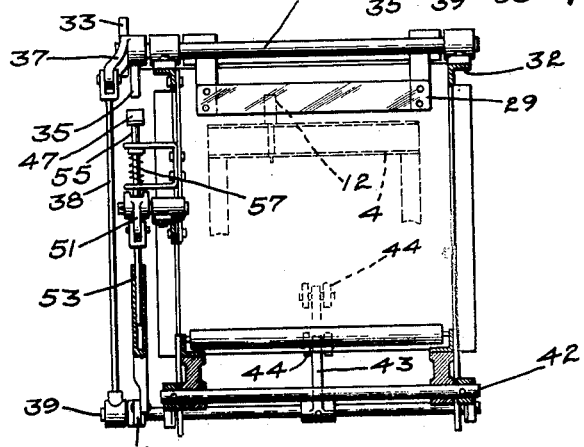
Figure 10 is a cross-sectional view on the line 10—10 of Figure 6.

Figure 6 shows the mechanism in normal position with an empty tray about to enter the loading section of the conveyer. From the position shown in Figure 6, the tray passes onto the gravity roller section 27 and continues thereon until the control pin 12 engages an actuating bar 29, transversely arranged above the gravity roller section 27. This actuating bar is secured to a shaft 31 supported in bearings secured to an upright frame 32 secured to the side members of the gravity roller section 27. A weighted arm 33 is terminally mounted upon one end of the shaft 31 and has a cam 34 integrally formed therewith, but oppositely extending therefrom. The cam 34 is in constant engagement with a finger 35 terminally mounted upon a shaft 36 mounted in bearings which also are secured to the upright frame 32. An oppositely extending arm 37 is provided upon the hub of the finger 35, and has a pivotal connection with a connecting rod 38, having its lower end pivotally connected to a swinging rod 39 terminally supported in a pair of oscillating arms 41 secured to the opposite ends of a shaft 42, transversely arranged beneath the gravity roller section 27. An arm 43, having rollers 44 rotatably mounted at one end thereof, is secured to the swinging rod 39 intermediately thereof, as shown in Figures 9 and 10. A plurality of shorter gravity rollers 45 are provided in the gravity roller section 27, as shown in Figure 9, and these shorter rollers have their inner ends supported in plates 46 terminally secured to cross members 47 having their ends supported upon the side members of the gravity conveyer section 27. The plates 46, supporting the inner ends of the rollers 45, are spaced apart to provide an opening in the conveyer section 27 adapted to receive the rollers 44, terminally mounted upon the arm 43. When the empty tray passes onto the loading section 27 and the control pin 12 engages the actuating bar 29, the cam 34 is moved from the position shown in Figure 6 to that shown in Figure 7, thereby depressing the finger 35 with the resultant raising of the swinging rod 39 to elevate the stop rollers 44 above the surface of the empty tray, as shown in Figures 7 and 10, in a position to be engaged by the package, when delivered onto the tray.

The means provided for automatically stopping the tray upon the loading conveyer section 27 consists of a spring-actuated latch 47 reciprocally mounted in a support 48 provided upon the upright frame 32. The upper end of the latch is normally positioned, as shown in Figures 6 and 7, in the path of a finger 49 secured to the shaft 31 and operable with the weighted arm 33 and the cam 34. Referring to Figures 6 and 7, it will be noted that when the control pin 12 engages the actuating bar 29, the shaft 31 will be rocked in its bearings, thereby causing the cam 34 to actuate the finger 35, after which the finger 49 will engage the upper end of the latch 47 and lock the cross shaft 31 against further movement with the result that the actuating bar 29 will likewise be locked against movement, thereby preventing the control pin from passing under it, with the resultant stopping of the tray upon the loading conveyer section 27. Such actuation of the above parts will, as hereinbefore stated, cause the stop roller 44 to be elevated above the surface of the empty tray, as shown in Figures 7 and 10.

Figure 7:
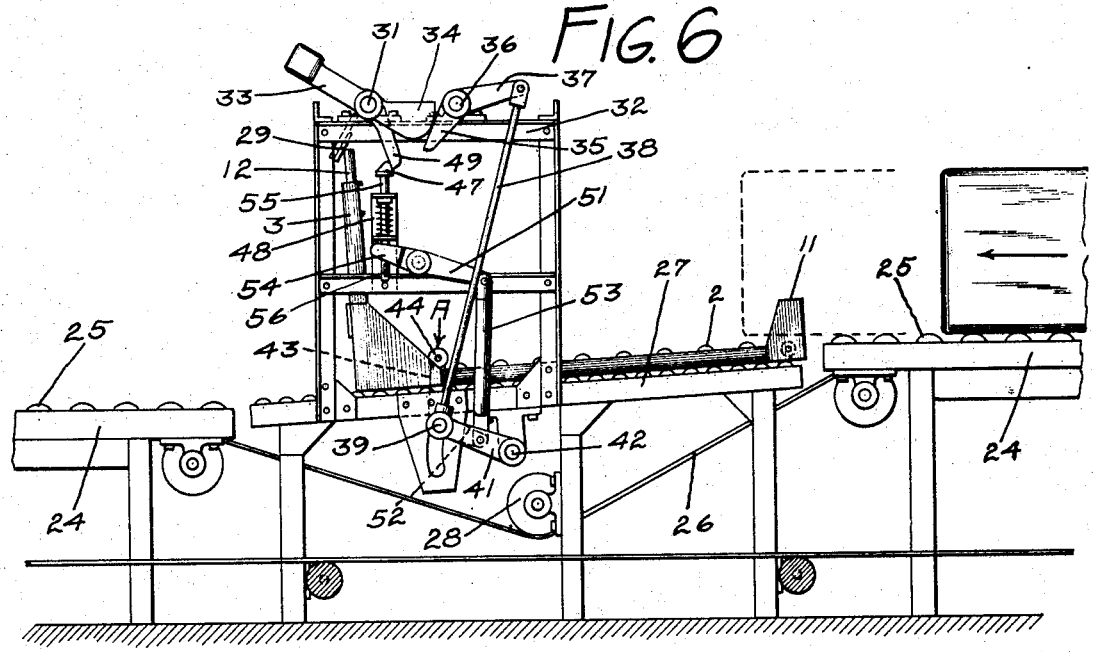
Figure 7 is a similar view showing a tray positioned thereon adapted to receive a package, and the mechanism positioned to be actuated by the package to release the tray.
Figure 8:
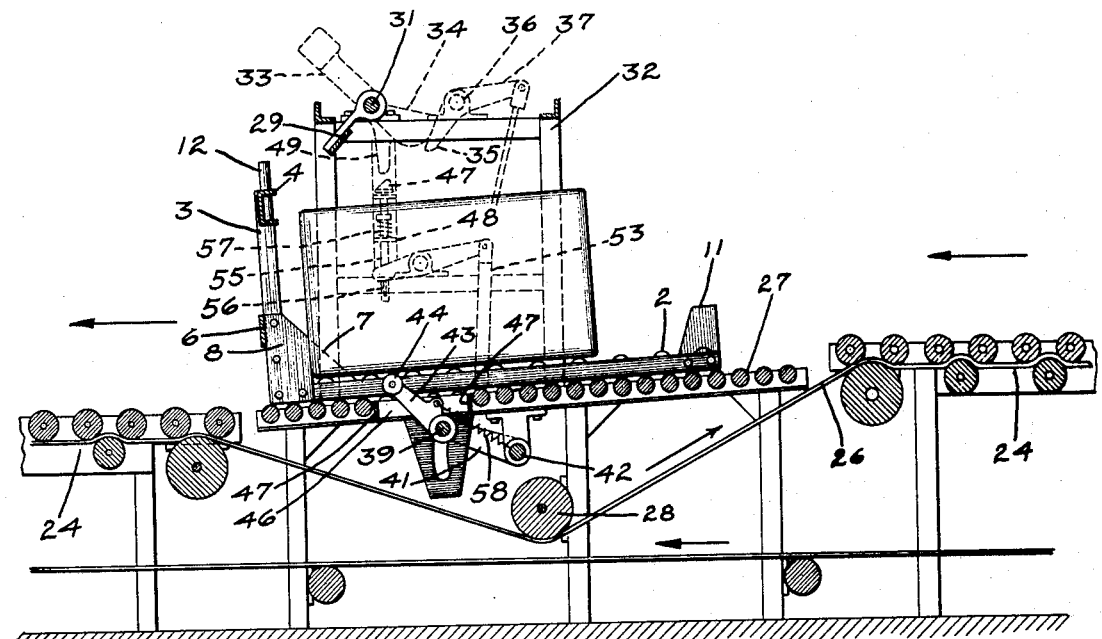
Figure 8 is a longitudinal sectional view on the line 8—8 of Figure 9 showing a package positioned upon the tray after having actuated the mechanism to release the tray.

The package is then allowed to pass from the conveyer section 24, at the right hand side of Figure 7, onto the empty tray positioned upon the loading section. As the package travels onto the tray, the forward end thereof engages the stop rollers 44 and depresses the rollers to the full line position shown in Figure 8. Such actuation of the rollers 44 and arm 43 will cause the rod 39 to be rocked in its bearings, thereby releasing the latch 47 from the finger 49 and permitting the tray, with a package positioned thereon, to commence its travel over the conveyer system. The means provided for releasing the latch 47 from the finger 49 consists of a forked lever 51 having a connection with an arm 52 by means of a telescopic connecting rod 53, shown in Figures 6, 7, 8, and 10. The arm 52, pivotally connected to the lower end of the telescopic connecting rod 53, is secured to the rod 39. The forked end 54 of the lever 51 straddles the lower end of the latch rod 55 and is adapted to engage oppositely extending projections 56 provided upon the latch rod. A compression spring 57 normally holds the latch 47 in the position shown in Figures 6 and 7. Thus, when the package passes onto the empty tray positioned upon the loading section 27 of the conveyer, it will engage the stop rollers 44 and depress the arm 43 to the position shown in Figure 8, thereby rocking the rod 39 with the resultant actuation of the telescopic connecting rod 53, lever 51 and forked end 54 of the lever to move the latch 47 out of engagement with the finger 49, as shown by the dotted lines in Figure 8. Such releasing of the finger 49 allows the control pin to further move the actuating bar 29 until it passes thereunder and the tray with the package thereon, passes from the loading section 27 onto the main conveyer section 24, shown at the left hand side of Figures 6 and 7. As soon as the control pin has passed under the actuating bar 29 and out of engagement therewith, as shown in Figure 8, the weighted arm 33 will return the bar 29 to its normal position, shown in Figure 6. Such return movement of the weighted arm 33 will cause the finger 49 to pass over the latch 47 and return to its normal position.

It will also be noted by reference to Figures 7 and 8 that the cam 34 is so formed as to hold the finger 35 and, therefore, the stop rollers 44 in the full line position shown in Figure 7, without imparting any further movement thereto during the completion of the movement of the actuating bar 29, after the latch has been released from the finger 49 by the loading of a package onto the empty tray. As soon as the control pin passes out of engagement with the bar 29, all of the parts will be returned to their normal positions, shown in Figure 6. A tension spring 58 has one end secured to the shaft 42 and its other end to the arm 43, upon which the stop rollers 44 are mounted. This spring functions to yieldably retain the arm 43 in a given position with respect to the arms 41, as shown in Figures 6 and 7.

*Mechanism for diverting packages from main conveyer*

Means are provided at the junctions A for automatically unloading the package from the routing tray and permitting the tray to continue along the main conveyer to be returned to the dispatcher or starting point, and to cause the packages following the tray to be diverted to the selected branch line 21, 22, or 23, and to permit other routing trays designated for other branch lines or destinations, to continue onward without interruption until their selected junctions are reached. (See Figures 11 to 14, inclusive). The means provided for thus automatically unloading the package from the tray at each junction A, consists of a short gravity roller section 111 connected with a power driven conveyer section 112 which has its other end connected with another gravity roller section 113. The operating mechanisms at the junctions A—A—A are similar, and but one of the mechanisms therefore will be described, like points being indicated by like numerals. A frame structure 114 is provided over the power driven conveyer section 112 and to this frame a deflector 115, having an upright shaft 116 is pivotally mounted in sutable bearings 117 and 118 secured to the frame 114, as shown in Figure 11. This deflector is normally in inoperative position as shown in full lines in Figure 11 in which position it wll not be engaged by the routing tray or following packages. The deflector 115 is retained in inoperative position by means of a weighted arm 119, pivotally mounted upon a bracket 121 secured to the frame 114. An upright arm 122 is secured to the weighted arm 119 and has a link 123 connecting it with a horizontal arm 124 secured to the upright shaft 116 of the deflector. The weighted arm 119 also has a fork 125 arranged to straddle an upright bar 126, having a pin or stud 127 mounted therein adapted to engage the lower edges of the fork 125 to provide means for positively moving the deflector from its operative to its inoperative position, when the bar 126 is moved upwardly, as will subsequently be described. The upright bar 126 is supported by parallel links 128 and 129, the former being secured to a cross shaft 131 and the latter to a shaft 132, supported by a bracket 133 secured to the gravity roller section 111. A depending finger 134 is secured to the shaft 131 and is adapted to be engaged by the control pin on the routing tray as shown in Figure 13. This finger 134 is transversely adjustable upon the shaft 131, as shown in dotted lines in the above figure. The finger 134 is held in adjusted position by a set screw 130. The bar 126 is normally held in its lower operative position by gravity and is adapted to be held in its upper position by means of a flat spring 135, secured to the frame 114 and having its flexing end adapted to engage a notch 136 provided in the edge of the bar 126, as shown in Figure 11. An arm 137 is also secured to the cross shaft 132, mounted beneath the gravity conveyer section 111, and has a member 138 terminally pivotally connected therewith which upwardly passes between a pair of guide rollers 139 and 141, interposed, respectively, between short roller sections 142 and 143, as shown in Figures 12 and 13. Stop rollers 144 are terminally mounted on the member 138 adapted to be moved above the surface of the routing tray, as shown in full lines in Figure 12, in a position to engage the package carried by the routing tray. Such engagement of the rollers 144 with the package will interrupt the travel of the package, but will permit the routing tray to continue onward, thereby causing the package to be unloaded from the routing tray, after which it will be held temporarily upon the gravity conveyer section 111 until the routing tray has traveled to the position shown in dotted lines on the left hand side of Figure 12. The stop rollers 144, when in normal inoperative position, are in dotted line position shown in Figure 11, wherein it will be noted that they are below the surface of the conveyer sections 111 and 112. The stop rollers 144 are moved into operative position by a control pin engaging the depending finger 134. (See Figure 12).

Arms 145 are secured to a shaft 146 and depend therefrom to provide a support for an actuating bar 147, secured thereto and adapted to be engaged by the control pins, as the trays pass under the shaft 146. An arm 148 is terminally secured to the shaft 146 and has a rod 149 connecting it with a bell crank 151, pivotally mounted upon the frame 114. The other end of the bell crank 151 has a rod 152 connecting it with a link 153, terminally secured to a rock shaft 154 mounted beneath the power driven roller section 112. A forked arm 155 is terminally secured to the opposite end of the rock shaft 154 and has a connection with a spring-actuated latch 156 which normally is in a raised position adapted to engage the end of the deflector 115 to retain it in operative position, as shown in full lines in Figure 14. The actuating bar 145 is adapted to be engaged by the control pin on each routing tray passing under the shafts 131 and 146 to move the latch 156 out of engagement with the end of the deflector 115 to allow the weighted arm 119 to return the deflector to its normal inoperative position, shown in Figure 11.

The above described mechanism, when actuated by a control pin, functions to release the deflector from its operative position over the conveyer section 112 and to cause it to be moved to its inoperative position, during which time the stop rollers 144 will be moved upwardly in a position to engage the package carried by the routing tray, thereby causing the latter to be unloaded therefrom and to have its travel temporarily interrupted while the routing tray continues onward over the power conveyer section 112 onto the gravity conveyer section 113, as shown in dotted lines in Figure 12.

The means provided for moving the stop rollers 144 out of engagement with the package to permit the latter to continue onward, is shown at the left hand side of Figures 11 and 12. A shaft 157 is mounted in bearings secured to uprights 158 and has a depending finger 159 adjustably secured thereto and adapted to be engaged by the control pin, as the routing tray passes under the shaft 157. An arm 161 is pivotally connected by a member 162, to the horizontal arm 124 connected to the arm 122 of the weighted arm 119 by the link 123. By thus connecting the finger 159 with the deflector 115 and the fork 125 through the arm 122, the above-mentioned parts will be operated when the finger 159 is engaged by a control pin.

In the operation of the above described mechanism, the control pin mounted upon the loaded tray approaching the power driven conveyer section 112, will engage the bar 145 and rock the shaft 154 beneath the power driven conveyer section 112, thereby oscillating the forked arm 155 and thus, moving the latch 156 out of engagement with the end of the deflector 115, as shown in Figure 12, which permits the weighted arm 119 to return the deflector to its normal inoperative position. As the routing tray continues onward, the control pin will engage the depending finger 134, thereby rocking the shaft 132 with the resultant raising of the stop rollers 144 to the operative position, shown in full lines in Figure 12. The raising of the stop rollers 144 is timed with respect to the travel of the package so as to cause the rollers to engage the forward lower corner of the package, as shown in Figure 12, thereby temporarily arresting the movement thereof and permitting the tray to pass out from under the package to discharge the latter onto the gravity conveyer section 111.

As a result of the deflector 115 having been moved to its inoperative position by the control pin engaging the actuating bar 147, the empty routing tray will continue onward over the power driven conveyer section 112 and onto the gravity roller section 113, where the control pin will engage the depending finger 159 and move it to the full line position shown in Figure 12. Such movement of the finger 159 will cause the upright shaft 116 of the deflector 115 to be rocked against the gravitational force of the weighted arm 119, until the end of the deflector engages the latch 156 which will thereafter lock the deflector against movement in the position shown in full lines in Figure 14. Such operation of the deflector 115 will cause the fork 125 of the weighted arm 119 to engage the pins 127 in the upright bar 126, thereby downwardly moving the bar 126 to its normal position with the resultant downward movement of the stop rollers 144 out of engagement with the package. The package will then continue onward and will engage the deflector 115 which will divert it from the main distributing conveyer onto the branch conveyer 21. When the above described mechanism has thus been operated to divert the packages from the main conveyer onto the branch conveyer, the routing tray will continue onward over the main conveyer, through the junction A to a junction B, where the tray will be shunted off the main conveyer onto a storage branch line 163, having a connection with the main conveyer at the central dispatching station, so that the tray may again be used for selectively routing other packages over the conveyer system to a given destination. A storage line 164 is also provided adjacent the line 163 and is adapted to receive packages returned to the dispatcher for re-routing. The operation of the mechanism at junction B is also actuated by the control pin on the tray, and the mechanism is so constructed and arranged that it will automatically shunt the empty trays onto the storage line 163 and allow the surplus packages to be delivered onto the storage conveyer 164 for re-routing. The constructional details of this mechanism will be covered in another application.

I claim as my invention:

1. An apparatus of the class described, comprising a main conveyer, a plurality of branch conveyers leading therefrom, deflecting mechanisms on said main conveyer for diverting articles therefrom to the branch conveyers, an article-carrying member movable over the main conveyer, control means on said member adapted selectively to actuate one of said deflecting mechanisms to cause following articles to be diverted from the main conveyer to a selected branch conveyer, means also actuable by said control means to effect the unloading of the article from said member and to permit the member to continue onward over the main conveyer after said deflecting mechanism has been operated to divert the articles onto a selected branch conveyer.

2. An apparatus of the class described comprising a main conveyer and a branch conveyer, a deflector pivotally mounted upon the main conveyer and adapted to divert articles therefrom onto said branch conveyer, means normally holding said deflector in operative position over said main conveyer, an article-carrying routing tray movable over the main conveyer, a control pin adjustably positioned upon said routing tray and adapted to actuate means to cause said deflector to be moved to its inoperative position, an article stop roller normally positioned beneath the surface of said main conveyer, operating mechanism for said stop roller adapted to be actuated by said control pin to elevate said stop roller into the path of the article on said tray, whereby said article will be removed from said tray and will be temporarily held upon said main conveyer while said tray continues onward over the main conveyer to return to its source, and means adapted to be engaged by said control pin to move said deflector to its operative position and to move said stop roller out of engagement with the article, after which the latter will continue its travel and will engage said deflector and will be diverted onto said branch conveyer.

3. An apparatus of the class described comprising a main conveyer and a branch conveyer, a deflector pivotally mounted upon the main conveyer and adapted to divert articles therefrom onto said branch conveyer, means normally holding said deflector in operative position over said main conveyer, an article-carrying routing tray movable over the main conveyer, a control pin adjustably positioned upon said routing tray adapted to actuate means to cause said deflector to be moved to its inoperative position, an article stop roller normally positioned beneath the surface of said main conveyer, operating mechanism for said stop roller over said main conveyer adapted to be actuated by said control pin to elevate said stop roller into the path of the article on said tray, whereby said article will be removed from said tray and will be temporarily interrupted upon said main conveyer while said tray continues onward over the main conveyer to return to its source, and means associated with said deflector and said stop roller and adapted to be engaged by said control pin to move said deflector to its operative position and to move said stop roller out of engagement with the article, after which the latter and following articles will continue their travel and will engage said deflector and will be diverted onto said branch conveyer.

4. An apparatus of the class described, comprising a conveyer, a routing tray, movable thereover, means for temporarily interrupting the travel of the tray over said conveyer, means for loading a package or article upon said tray when thus temporarily held upon the conveyer, and means engageable by the article to release the routing tray and permit it to continue onward over the conveyer.

5. An apparatus of the class described, including a conveyer, a loading mechanism on the conveyer, an article-carrying routing tray, movable over the conveyer to direct following articles to a selected branch conveyer, means connected with said loading mechanism for temporarily interrupting the travel of the tray thereover, and a releasing device adapted to be engaged by an article as it is loaded onto said routing tray to effect the release of the routing tray and permit it to travel over the conveyer to a selected destination.

6. An apparatus of the class described, comprising a conveyer, an article-carrying tray movable over said conveyer and adapted to direct articles to selected destinations, a tray-loading mechanism comprising a conveyer section having a frame arranged thereover, a shaft mounted in said frame, a depending bar supported by said shaft and normally positioned in the path of said routing tray, and means associated with said shaft and bar for limiting the movement of the bar, when engaged by said routing tray, and to effect the temporary interruption of said routing tray upon said conveyer section to permit the latter to be loaded.

7. An apparatus of the class described, comprising a conveyer, an article-carrying tray movable over said conveyer and adapted to direct articles to selected destinations, a tray-loading mechanism comprising a conveyer section having a frame arranged thereover, a shaft mounted in said frame, a depending bar supported by said shaft and normally positioned in the path of said routing tray, a finger terminally secured to said shaft, a spring-actuated stop pawl engageable with said finger for limiting the movement of the bar, when engaged by the routing tray, and to effect the temporary interruption of said routing tray upon said conveyer section to permit the latter to be loaded.

8. An apparatus of the class described, comprising a conveyer, an article-carrying tray movable over said conveyer and adapted to direct following articles to selected destinations, a tray-loading mechanism comprising a conveyer section, a supporting frame arranged over said conveyer section, a shaft mounted in said frame, a depending bar supported by said shaft, control means on the tray adapted to engage and actuate said bar, means for limiting the movement of said bar and to temporarily interrupt the movement of the tray over said conveyer section to permit an article to be loaded thereon, and means adapted to be engaged by the article to automatically release said tray and to permit it to continue onward to its destination.

9. An apparatus of the class described, comprising a conveyer, an article-carrying tray movable over said conveyer and adapted to direct following articles to selected destinations, a tray-loading mechanism comprising a conveyer section, a supporting frame arranged over said conveyer section, a shaft mounted in said frame, a depending bar supported by said shaft, a control means on the tray adapted to engage and actuate said bar, means for limiting the movement of said bar and to temporarily hold the tray on said conveyer section to permit an article to be loaded thereon, and means associated with said bar and adapted to be engaged by the article to automatically release said tray and to permit it to continue onward to its destination with an article thereon.

10. An apparatus of the class described, comprising a conveyer, an article-carrying tray movable over said conveyer and adapted to direct articles to selected destinations, control means on the tray, a tray-loading mechanism comprising a conveyer section, a supporting frame over said conveyer section, a rock-shaft mounted in said frame, a depending bar supported by said rock-shaft and adapted to be engaged by said control means, a finger secured to said shaft and engageable with a spring-actuated pawl for limiting the rotation of said shaft and to interrupt the movement of said tray over said conveyer section, a second shaft also mounted in said frame, a member terminally secured to said second shaft, a cam secured to the rock-shaft and engaging said finger, a stop means normally positioned beneath said conveyer section and having a connection with said cam-actuated finger whereby, when said depending bar is actuated by said control means, said stop means will be moved to a position above the surface of said tray to be engaged by an article loaded thereonto, such engagement of the article with stop means causing the latter to depress said spring-actuated pawl to effect the release of said bar and to permit the loaded tray to commence its travel over the conveyer system.

11. An apparatus of the class described comprising a conveyer, an article-carrying tray movable over said conveyer and adapted to direct articles to selected destinations, control means on the tray, a tray-loading mechanism comprising a conveyer section, a supporting frame over said conveyer section, a rock-shaft mounted in said frame, a bar secured to said rock-shaft and adapted to be engaged by said control means, a finger also secured to said shaft and engageable with a spring-actuated pawl for limiting the rotation of said shaft and to interrupt the movement of said tray over said conveyer section, a second shaft also mounted in the upper portion of said frame, a member terminally secured to said second shaft, a cam secured to the rock-shaft and engaging said finger, a weight tending movably to return said bar to its normal position, a stop means normally positioned beneath said conveyer section and having a connection with said cam-actuated finger whereby, when said depending bar is actuated by said control means, said stop means will be moved to a position above the surface of said tray to be engaged by an article loaded thereonto, such engagement of the article with said stop means causing the latter to depress said spring actuated pawl and to effect the release of the loaded tray, after which said weight will return the parts to their normal position.

12. An apparatus of the class described, including a routing tray, comprising two sections connected together at one end, an upright frame at one end of the tray, a transverse member at the upper end of the frame, a plurality of spaced apertures in said member and a control means adapted to be engaged with one of said apertures to selectively actuate the mechanism for diverting packages from a main conveyer onto a selected branch conveyer.

13. An apparatus of the class described, including a routing tray comprising two conveyer sections connected together at one end, an upright frame structure at the forward end of the tray, a cross-member at the upper portion of said structure, a plurality of spaced apertures in said member, a control pin adapted to be selectively engaged with one of said apertures and adapted to actuate mechanism for diverting articles from a main conveyer onto a selected branch conveyer, and said conveyer sections being spaced apart to provide a clearance gap therebetween.

14. An apparatus of the class described, including a routing tray comprising two roller conveyer sections connected together in spaced parallel relation, an upright frame connecting together the forward ends of said conveyer sections, a transverse channel member secured to the upper portion of said upright frame, a plurality of spaced apertures in the upper web of said channel member and a plurality of relatively smaller apertures in the lower web of said member, the apertures in said web being arranged in vertical alignment and adapted to selectively receive a shouldered control pin, and stop means at the forward end of the tray adapted to be engaged by articles loaded thereon.

In witness whereof, I have hereunto set my hand this 14 day of February, 1927.

MARTIN J. ANDERSON.